United States Patent
Gross et al.

(10) Patent No.: US 10,434,555 B2
(45) Date of Patent: Oct. 8, 2019

(54) METROLOGY ASSISTED PART FORMING SYSTEM AND METHOD

(71) Applicant: The Boeing Company, Chicago, IL (US)

(72) Inventors: Brenda C. Gross, Tacoma, WA (US); John W. Dorsey-Palmateer, Daniel Island, SC (US)

(73) Assignee: The Boeing Company, Chicago, IL (US)

( * ) Notice: Subject to any disclaimer, the term of this patent is extended or adjusted under 35 U.S.C. 154(b) by 639 days.

(21) Appl. No.: 14/966,091

(22) Filed: Dec. 11, 2015

(65) Prior Publication Data
US 2017/0165732 A1    Jun. 15, 2017

(51) Int. Cl.
 *B21C 51/00* (2006.01)
 *G01B 21/20* (2006.01)
 *B64C 1/06* (2006.01)

(52) U.S. Cl.
 CPC ............ *B21C 51/005* (2013.01); *B64C 1/064* (2013.01); *G01B 21/20* (2013.01)

(58) Field of Classification Search
 CPC ........ B21C 51/005; B64C 1/064; G01B 21/20
 See application file for complete search history.

(56) References Cited

U.S. PATENT DOCUMENTS

| | | | |
|---|---|---|---|
| 4,750,965 A | 6/1988 | Pippel et al. | |
| 7,480,037 B2 | 1/2009 | Palmateer et al. | |
| 2004/0098852 A1* | 5/2004 | Nelson | B29C 70/202 29/428 |
| 2007/0127015 A1* | 6/2007 | Palmateer | G01B 11/25 356/237.1 |
| 2010/0106460 A1* | 4/2010 | Henle | G06K 9/3233 702/182 |
| 2010/0281638 A1* | 11/2010 | Reed | B60S 3/042 15/53.4 |
| 2010/0310180 A1* | 12/2010 | Toyoda | H01L 22/12 382/203 |
| 2013/0338267 A1 | 12/2013 | Appleby et al. | |

* cited by examiner

*Primary Examiner* — Qian Yang
(74) *Attorney, Agent, or Firm* — Miller, Matthias & Hull LLP (57) ABSTRACT

Systems and methods for using metrology to assist a user at a workstation to form a part into a desired contour include scanning the part to obtain scanned data indicative of an actual contour of the part. Distance errors are determined based on a comparison of the scanned data to a computer model of the desired contour. A contour map of deviation is determined based on the distance errors, with the contour map of deviation indicating magnitudes of the distance errors for at least a selected set of points on the actual contour of the part. Visible indicium is projected onto the part that represents the contour map of deviation, thereby assisting the user of the workstation to identify where further modification of the actual contour is needed.

20 Claims, 6 Drawing Sheets

METROLOGY ASSISTED PART FORMING SYSTEM AND METHOD

FIELD

The present disclosure generally relates to metrology and, more specifically, to systems and methods of manufacturing forming using metrology.

BACKGROUND

Current part formation processes are typically labor intensive and time consuming. For example, when using a workstation to form a workpiece into a face sheet for a lay-up mandrel, it is common to apply two-dimensional templates to the workpiece to assist with determining where and how much to bend the workpiece to obtain a desired contour. The process is typically iterative, such that multiple templates and bending operations may be used. Additionally, to obtain the desired fit between the face sheet and a base of the mandrel, the face sheet periodically may be placed on the base and any deviations in fit are marked on the face sheet, which is then returned to the workstation for further forming. The use of physical templates and repositioning of the face sheet require extensive manual labor and additional time and safety considerations, particularly when the face sheet and base are relatively large.

SUMMARY

In accordance with one aspect of the present disclosure, a method is provided of using metrology to assist in forming a part into a desired contour obtained from a computer model of the part. The method includes scanning the part to obtain a first set of scanned data indicative of a first actual contour of the part. Next, a first set of distance errors is determined based on a comparison of the first set of scanned data indicative of the first actual contour to the computer model of the desired contour. A first contour map of deviation is determined based on the first set of distance errors, the first contour map of deviation being indicative of magnitudes of the first set of distance errors for at least a selected set of points on the first actual contour of the part. The method further includes projecting a first visible indicia onto the part, the first visible indicia being based on the first contour map of deviation.

In accordance with another aspect of the present disclosure, a system is provided for forming a part into a desired contour. The system includes a workstation configured to manipulate a shape of the part, and a scanner positioned relative to the workstation and configured to obtain a first set of scanned data indicative of a first actual contour of the part. A computer modeling module is associated with the workstation and configured to create a computer model of the desired contour of the part. A comparator module is communicatively coupled to the scanner and the computer modeling module and configured to compare the first set of scanned data indicative of the first actual contour with the computer model of the desired contour to obtain a first set of distance errors between the first actual contour and the desired contour, and determine a first contour map of deviation based on the first set of distance errors, the first contour map of deviation being indicative of magnitudes of the first set of distance errors for at least a selected set of points on the first actual contour of the part. A projector is associated with the workstation and communicatively coupled to the comparator module, the projector being configured to project a first visible indicia onto the part, the first visible indicia being based on the first contour map of deviation.

In accordance with a further aspect of the present disclosure, a method of using metrology to optimize a manufacturing process to form a part having a desired contour includes generating a computer model of the desired contour. The method further includes forming a first workpiece having an initial contour by bending the first workpiece from the initial contour to a first modified contour, scanning the first workpiece to obtain first scanned data indicative of the first modified contour of the first workpiece, bending the first workpiece from the first modified contour to a second modified contour, scanning the first workpiece to obtain second scanned data indicative of the second modified contour of the first workpiece, and storing the first and second scanned data as a first set of scanned data associated with the first workpiece. Additionally, the method includes forming a second workpiece having an initial contour, the initial contour of the second workpiece being substantially identical to the initial contour of the first workpiece, by bending the second workpiece from an initial contour to a first modified contour, scanning the second workpiece to obtain first scanned data indicative of the first modified contour of the second workpiece, bending the second workpiece from the first modified contour to a second modified contour, scanning the second workpiece to obtain second scanned data indicative of the second modified contour of the second workpiece, and storing the first and second scanned data as a second set of scanned data associated with the second workpiece. The first and second sets of scanned data are compared to identify an optimized sequence of bends for forming the part.

It should be understood that the drawings are not necessarily drawn to scale and that the disclosed embodiments are sometimes illustrated schematically. It is to be further appreciated that the following detailed description is merely exemplary in nature and is not intended to limit the disclosure or the application and uses thereof. Hence, although the present disclosure is, for convenience of explanation, depicted and described as certain illustrative embodiments, it will be appreciated that it can be implemented in various other types of embodiments and in various other systems and environments.

DETAILED DESCRIPTION

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

Figure 1:
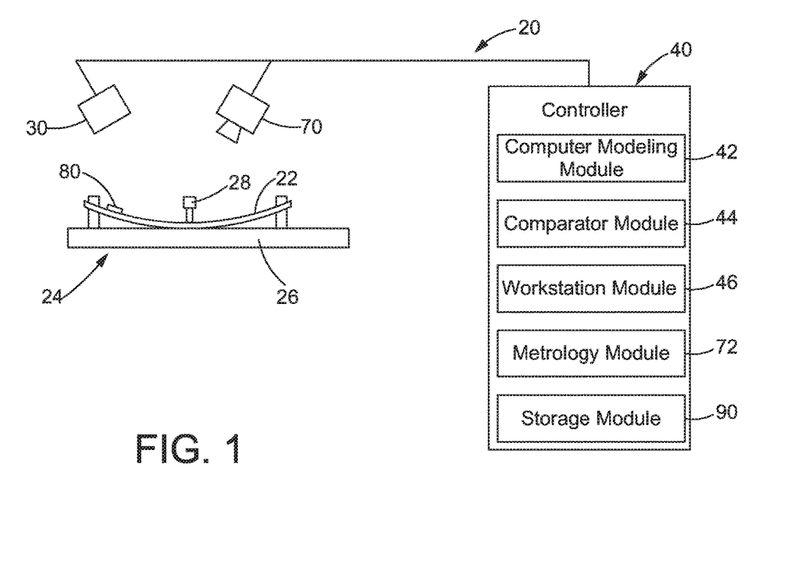
FIG. 1 is a schematic illustration of an exemplary part forming system according to the present disclosure.

As best shown in FIG. 1, a system 20 is shown for forming a part 22 into a desired contour. In the exemplary embodiments described herein, the part 22 is to be formed as a metal face sheet for a lay-up mandrel. More specifically, the lay-up mandrel face sheet may be coupled to a base (not shown) to form the mandrel, which in turn may be used to form components out of composite materials, such as skins, supports, or other components used on an aircraft. Accordingly, the lay-up mandrel face sheets typically have outer surfaces with complex contours that are precisely formed to meet design specifications. While this detailed description refers to the part 22 as being formed into a lay-up mandrel face sheet, it will be appreciated that the systems and methods described herein are not so limited, but instead may be used to form other types of parts that may require precisely formed contours.

Referring further to FIG. 1, the system 20 generally includes a workstation 24 configured to manipulate a shape of the part 22. As used herein, the term "workstation" means any tool that is capable of manipulating the shape of a metal sheet or plate, such as a machine press or brake form, as are generally known in the art. As shown in FIG. 1, the workstation 24 may include a support 26 on which the part 22 may be placed, and a tool 28 configured to engage the part 22 to alter its shape, thereby forming the part 22 with a contour. In some embodiments, the workstation 24 performs a three-point bend process as schematically illustrated in FIG. 1, however the workstation 24 may be configured to perform other processes that alter the contour of the part 22.

The system 20 further includes at least one scanner 30 for detecting an actual contour of the part 22. As best shown in FIG. 1, the scanner 30 is positioned relative to the workstation 24. In some embodiments, the scanner 30 is provided as a radar laser scanner configured to obtain sets of scanned data indicative of actual contours of the part 22. For example, the scanner 30 may be a three-dimensional radar laser scanner, so that the set of scanned data defines a three-dimensional profile of the part 22. Accordingly, the sets of scanned data represent actual contours of the part 22 as it has been fabricated. When provided as a three-dimensional laser radar scanner, the scanner 30 is capable of directly determining positional X, Y, and Z coordinates of several points along the part 22, from which the contour of the part 22 may be determined.

The system 20 may further include one or more controllers 40 for creating a computer model of a desired contour of the part, comparing the scanned data to the computer model, and generating a map of deviation indicative of a magnitude of error between the actual location and the desired location of points on the actual contour of the part 22. As schematically illustrated in FIG. 1, a controller 40 is in electrical communication with the scanner 30. The controller 40 may be implemented using any one or more of a processor, a microprocessor, a microcontroller, a field programmable gate array (FPGA), a programmable read-only memory (PROM), or any other device that can be operated in accordance with preprogrammed instructions and/or algorithms disclosed herein. In the exemplary embodiment, the controller 40 may be preprogrammed according to one or more algorithms generally categorized into a computer modeling module 42 and a comparator module 44. Optionally, the controller 40 further may be in electrical communication with the workstation 24 and include a workstation module 46. While the modules are shown in FIG. 1 as being embodied in a single controller 40, it will be appreciated that they may be provided in separate controllers, each of which is directly or indirectly in electronic communication with each other.

Figure 2:
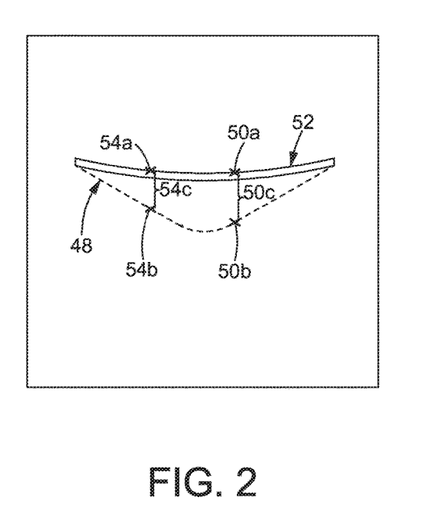
FIG. 2 is a graphical illustration of a comparison of scanned data obtained from the part forming system of FIG. 1 and representing an actual contour of the part to a desired contour obtained from a computer model of the part.

The computer modeling module 42 is configured to create a computer model of a part that includes a model surface formed in a desired model contour. For example, as schematically illustrated in FIG. 2, a desired contour 48 of the computer model may represent the shape of the part when the part is in a desired configuration. In some embodiments, the computer modeling module comprises a CAD module configured to create a finite element analysis model of the model surface formed in the desired model contour.

The comparator module 44 is in direct or indirect electronic communication with the scanner 30 and the computer modeling module 42, and is configured to compare the scanned data indicative of an actual contour 52 with the computer model of the desired contour to obtain a set of distance errors between the first actual contour and the desired contour. For example, as schematically illustrated in FIG. 2, the comparator module may be configured to compare the actual location of a first point 50a along the actual contour 52 of the part 22 to a desired location of a first corresponding point 50b along the desired contour of the computer model of the part, and determine a first distance error 50c therebetween. This comparison between actual position and desired position may be repeated for multiple points, such as second point 54a and second corresponding point 54b having a second distance error 54c therebetween, thereby to obtain a set of distance errors.

Figure 3:
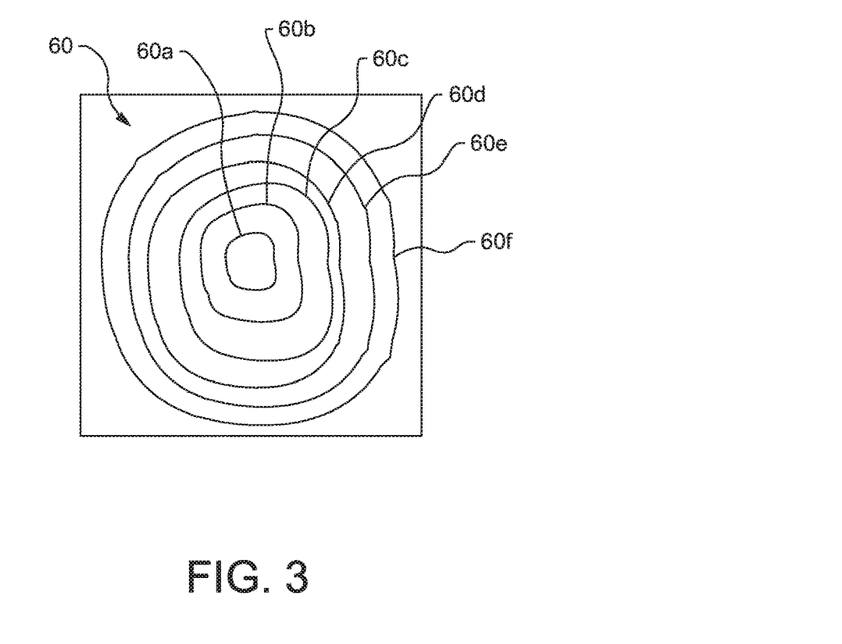
FIG. 3 is a graphical illustration of a first topographical contour map of deviation.
Figure 4:
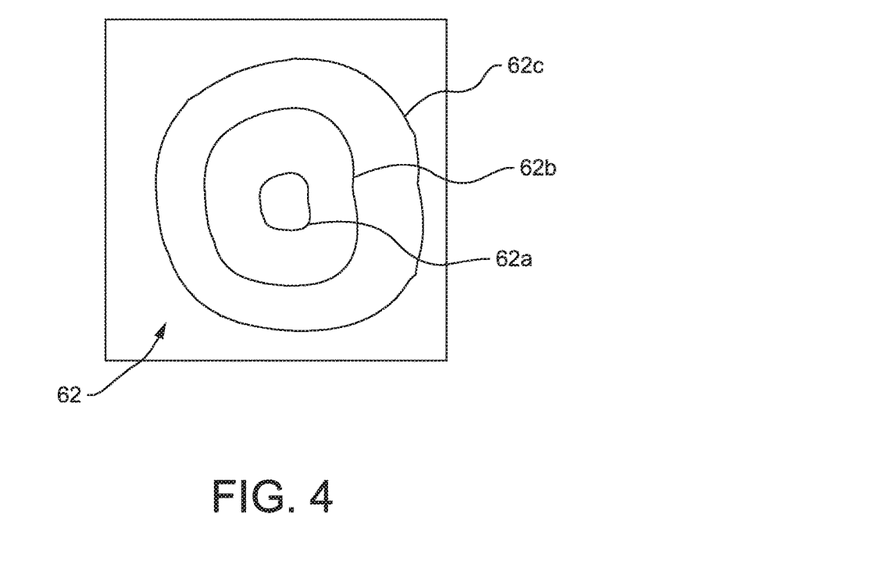
FIG. 4 is a graphical illustration of a second topographical contour map of deviation.

The comparator module 44 is further configured to determine a contour map of deviation based on the distance errors described above. More specifically, the contour map of deviation is indicative of magnitudes of the distance errors for at least a selected set of points on the first actual contour 52 of the part. FIGS. 3 and 4 illustrate exemplary first and second topographical contour maps 60, 62 in the form of topographical contour lines 60a-f and 62a-c, respectively.

Figure 5A:
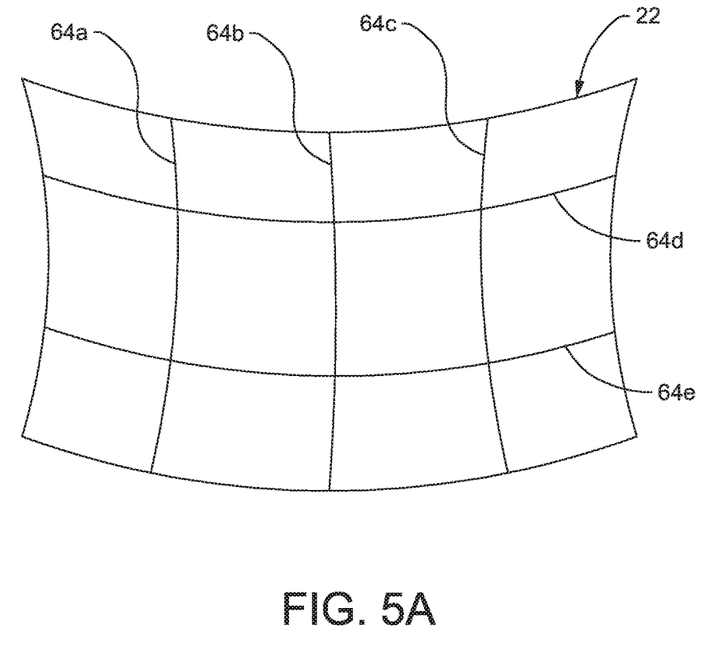
FIG. 5A is a graphical illustration of an initial iso-line map of deviation.
Figure 5B:
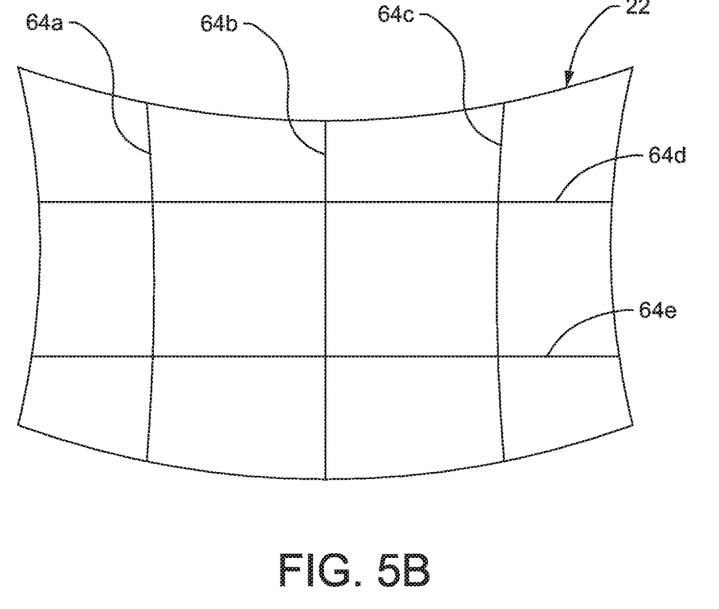
FIG. 5B is a graphical illustration of a subsequent iso-line map of deviation.

Alternatively, the contour map of deviation may be expressed as iso-lines, as graphically illustrated in FIGS. 5A and 5B. As used herein, the term "iso-line" is used to identify visible lines used on a part and having an initial shape indicative of a magnitude of bend required to manipulate the part into a desired contour. As would be generally understood in the art, iso-lines have an initial curvature that lessens as the shape of the part approaches the desired contour, such that the iso-lines appear linear when the part is in the desired contour. Referring to FIG. 5A, the part 22 has an initial contour with iso-lines 64a-e, with the curvature of the iso-lines 64a-e exaggerated for clarity. FIG. 5B illustrates the part 22 in a modified contour with the same iso-lines 64a-e. When comparing the curvature of the iso-lines 64a-e as shown in FIGS. 5A and 5B, it will be appreciated that the iso-lines 64a-e have a greater curvature when the part 22 is in the initial contour. As the shape of the part 22 is modified, the curvature of the iso-lines 64a-e is reduced and approaches linearity, indicating that the shape of the part is nearing or has reached the desired contour.

The system 20 further includes a projector 70 associated with the workstation 24 and communicatively coupled to the comparator module 44. The projector 70 is configured to project visible indicia onto the part 22, with the visible indicia being based on the contour map of deviation determined by the comparator module 44. For example, the visible indicia may be a pattern of topographical contour lines, such as the first topographical contour lines 60a-f of FIG. 3 or the second topographical contour lines 62a-c of FIG. 4. Alternatively, the visible indicia may be a pattern of iso-lines, such as the iso-lines shown in FIG. 5. The visible indicia may be readily observable to a user at the workstation to help inform the user how the part 22 should be further manipulated to obtain the desired contour 48. In some embodiments, the projector 70 may be provided as a laser projector configured to project a laser pattern onto the part 22 while the part is secured at the workstation 24.

Figure 6:
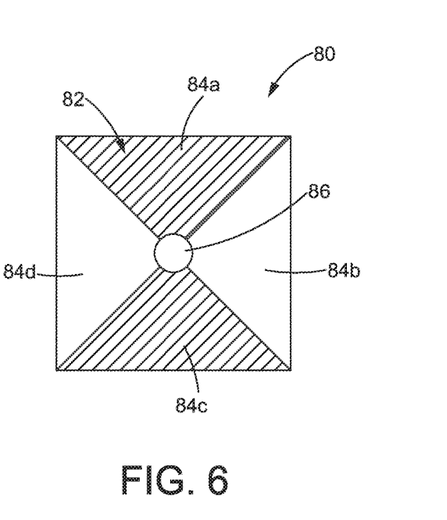
FIG. 6 is a schematic illustration of a target identifiable by a scanner and a projector of the system of FIG. 1.

The controller 40 may further include a metrology module 72 may be coupled to the part 22 for tracking locations of the scanner 30 and projector 70 relative to the part 22, so that the scanned data obtained by the scanner 30 may be registered with the visible indicia generated by the projector 70. Targets 80 may be used in association with the metrology module 72 which are coupled to the part 22 and are identifiable by both the scanner 30 and the projector 70, as best shown in FIGS. 1 and 6. Each target 80 may include a contrast target 82, which has regions 84a-d of highly contrasting colors which are readily identifiable by the scanner 30. Additionally, each target 80 may further include a reflective target 86, such as a retro-dot, that is readily identifiable by the projector 70. To improve calibration between scanner 30 and the projector 70, the reflective target 86 may be concentric with the contrast target 82, as shown. In other embodiments, an alternative target may be provided that includes a cylinder structure identifiable by the scanner 30, and a reflective target (such as reflective target 86) coupled to the cylinder structure and identifiable by the projector 70.

Still further, the controller 40 may include a storage module 90 configured to digitally archive information for later reference and/or use. For example, sets of scanned data and related contour maps of deviation may be digitally archived in the storage module 90 that may be later accessed for review or other uses, as described in greater detail below.

Figure 7:
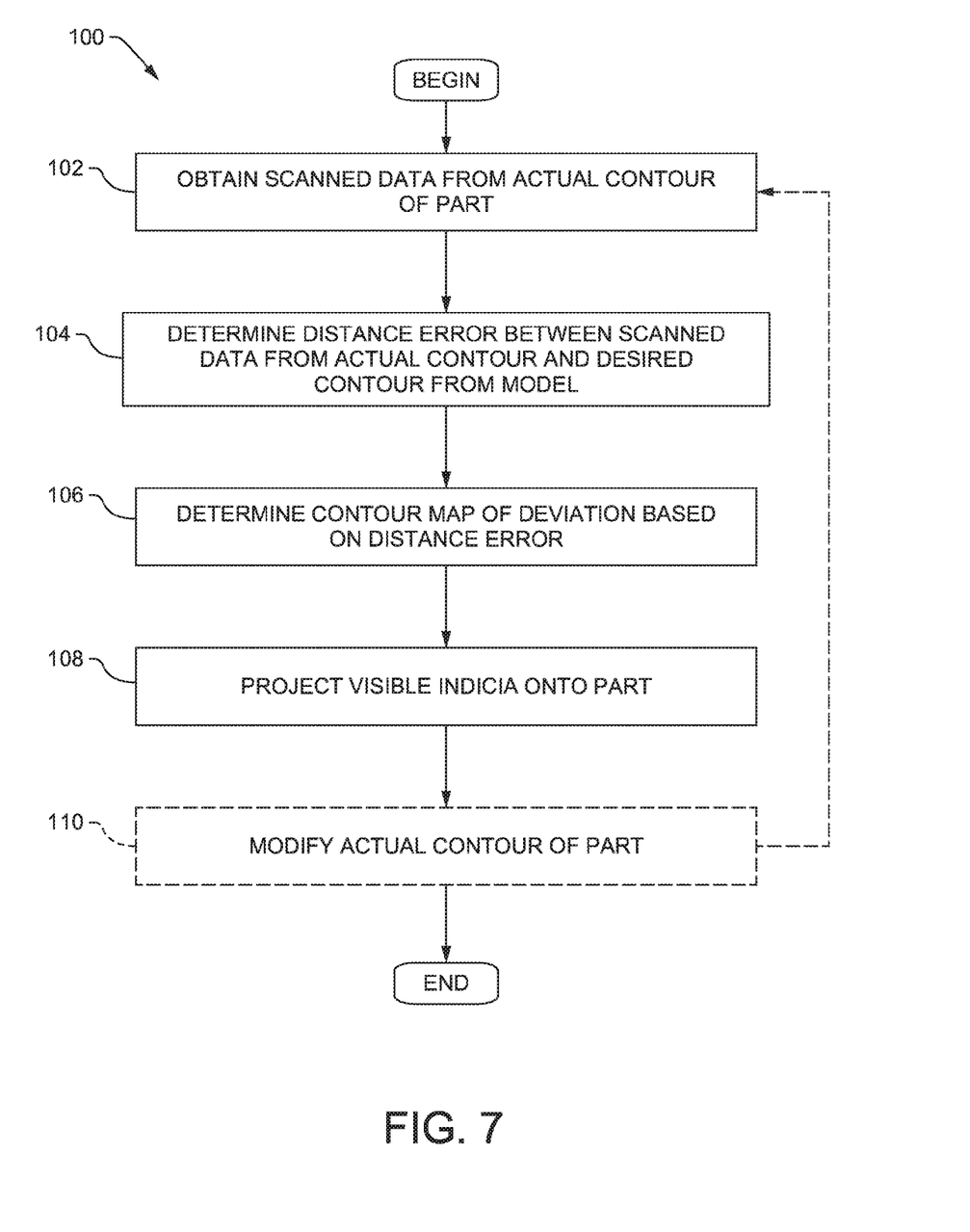
FIG. 7 is a flowchart illustrating one exemplary method of the present disclosure for using metrology to assist in forming a part into a desired contour obtained from a computer model of the part.

One exemplary algorithm or controller implemented method 100 for using metrology to assist in forming a part 22 into a desired contour 48 obtained from a computer model of the part is diagrammatically provided in FIG. 7. As shown, in block 102 the scanner 30 may be used to scan the part 22 to obtain a first set of scanned data indicative of a first actual contour 52 of the part 22. The computer model may correspond to the desired part shape when the part is in a desired configuration. Next, at block 104, the comparator module 44 may determine a first set of distance errors based on a comparison of the first set of scanned data indicative of the first actual contour 52 to the computer model of the desired contour 48. As noted above with reference to FIG. 2, each distance error may be determined by determining the difference between the location of a point on the actual contour 52 of the part 22 and the location of a corresponding point on the desired contour 48 of the computer model.

At block 106, the comparator module 44 may further determine a first contour map of deviation based on the first set of distance errors. The first contour map of deviation is indicative of magnitudes of the first set of distance errors for at least a selected set of points on the first actual contour 52 of the part 22. The first contour map of deviation may be expressed as topographical contour lines, iso-lines, or other indicia indicative of the difference between the actual contour and the desired contour. At block 108, the projector 70 may be used to project a first visible indicia onto the part 22, wherein the first visible indicia is based on the first contour map of deviation. As noted above, the first visible indicia may be a pattern of topographical contour lines, iso-lines, or other indicia.

The method 100 may optionally be reiterated, so that a series of scanning, projecting, and bending steps may be repeated to form the part 22 with the desired contour. For example, at block 110, with the visible indicia projected on the part 22, the user may use the workstation 24 to modify the actual contour 52 of the part 22, such as by bending the part 22. The location and amount of bending applied to the part 22 may be informed by the visible indicia. After bending, the method 100 may return to block 102 to scan the part 22. Because the bending at block 110 will modify the contour of the part, the scanning performed at block 102 will obtain a second set of scanned data indicative of a second actual contour of the part. Similarly, the comparator module 44 will determine a second set of distance errors based on a comparison of the second set of scanned data indicative of the second actual contour to the computer model of the desired contour. At block 106, the comparator module 44 will determine a second contour map of deviation based on the second set of distance errors, with the second contour map of deviation being indicative of magnitudes of the second set of distance errors for at least a selected set of points on the second actual contour of the part. Finally, at block 108 the projector will projecting a second visible indicia onto the part, the second visible indicia being based on the second contour map of deviation. It is expected that as further bends are applied to the part 22, the difference between the actual contour and the desired contour will decrease. Accordingly, the first contour map of deviation may have more contour lines, such as the first topographical contour map 60 of FIG. 3, while the second contour map of deviation may have fewer contour lines, such as the second topographical contour map 62 of FIG. 4. Furthermore, the bending process at block 110 may also be repeated, after which additional sets of scanned data and sets of distance errors may be determined, and additional contour maps of deviation and visible indicia may be generated.

The method 100 may further use the metrology module 72 to locate the part 22 relative to the scanner 30 and projector 70. More specifically, the method 100 may include coupling at least one target 80 to the part 22. The target 80 may include a contrast target identifiable by the scanner 30 and a reflective target identifiable by the projector 70. The method 100 may further include locating the part 22 for scanning by identifying a location of the contrast target, and locating the part 22 for projecting by identifying a location of the reflective target.

Figure 8A:
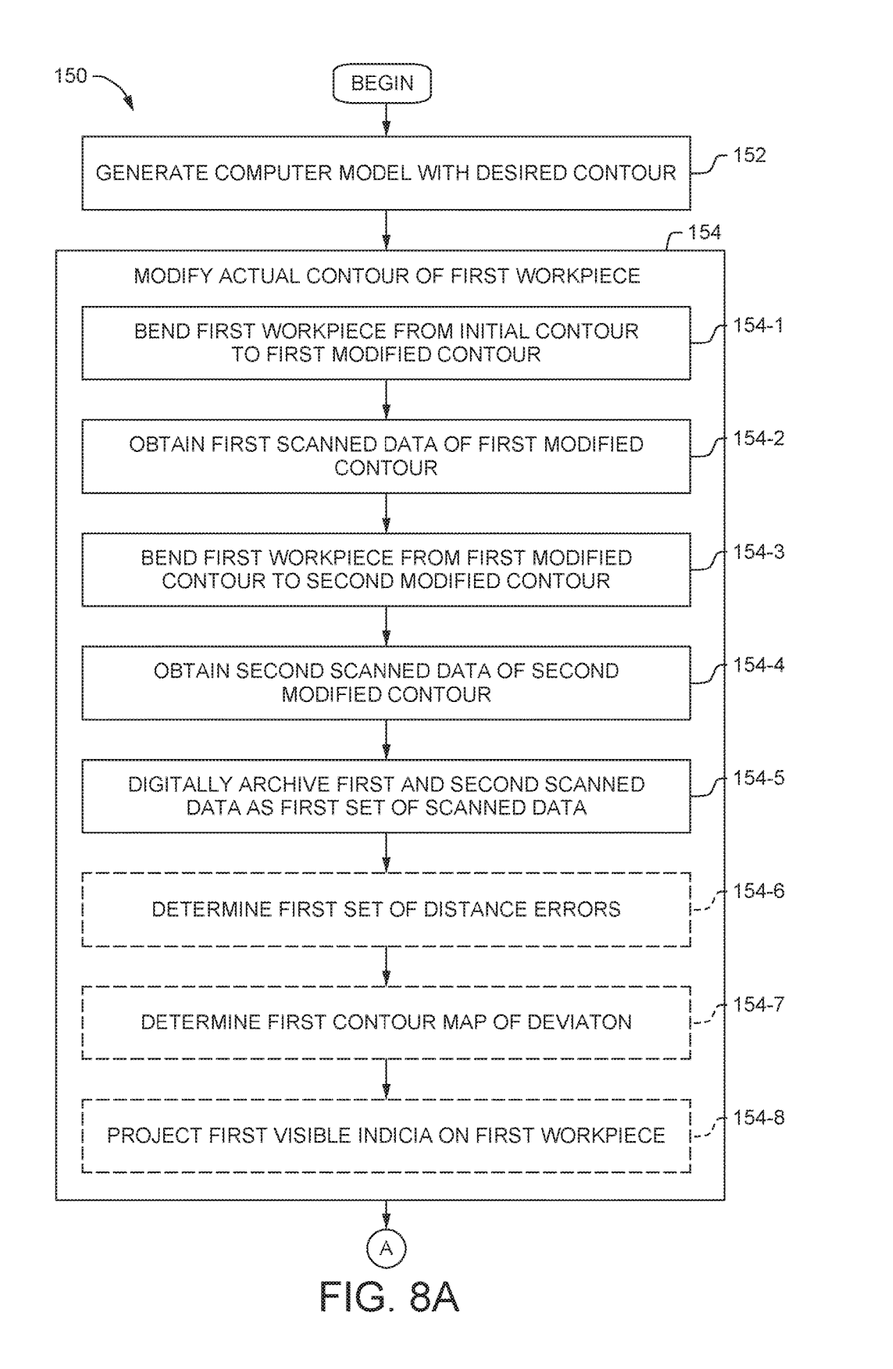
FIGS. 8A and 8B depict a flowchart illustration of another exemplary method of the present disclosure for using metrology to optimize a manufacturing process to form a part having a desired contour.
Figure 8B:
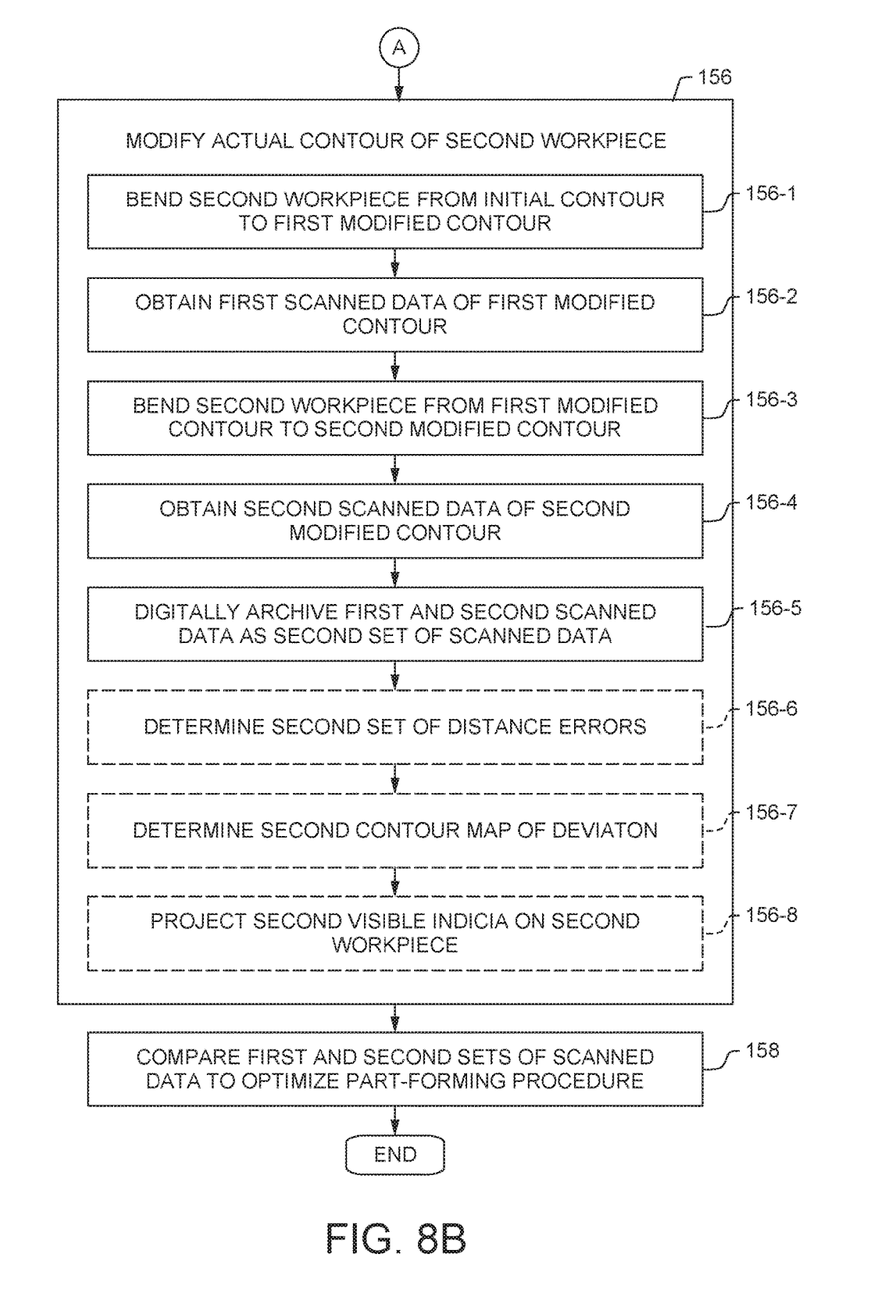

Another exemplary algorithm or controller implemented method 150 of using metrology to optimize a manufacturing process to form a part 22 having a desired contour 48 is diagrammatically provided in FIGS. 8A and 8B. Starting at block 152, the computer modeling module 42 may be used to generate a computer model of the desired contour 48. At block 154, the workstation 24 may be used to modify the actual contour of a first workpiece. More specifically, at block 154-1, the workstation 24 may be used to bend the first workpiece from an initial contour to a first modified contour. At block 154-2, the scanner 30 may be used to scan the first workpiece to obtain first scanned data indicative of the first modified contour of the first workpiece. At block 154-3, the workstation 24 may be used to further bend the first workpiece from the first modified contour to a second modified contour. At block 154-4, the scanner 30 may be used to scan the first workpiece to obtain second scanned data indicative of the second modified contour of the first workpiece. At block 154-5, the storage module 90 may be used to digitally archive the first and second scanned data as a first set of scanned data associated with the first workpiece.

The method 150 may further include forming a second workpiece in a manner similar to the first workpiece. That is, the second workpiece has an initial contour similar that is substantially identical to the initial contour of the first workpiece, as noted at block 156. As used herein, the term "substantially identical" means a contour that is within tolerance distances used for a workpiece of a given size. More specifically, at block 156-1, the workstation 24 may be used to bend the second workpiece from the initial contour to a first modified contour. At block 156-2, the scanner 30 may be used to scan the second workpiece to obtain first scanned data indicative of the first modified contour of the second workpiece. At block 156-3, the workstation 24 may be used to bend the second workpiece from the first modified contour to a second modified contour. At block 156-4, the scanner 30 may be used to scan the second workpiece to obtain second scanned data indicative of the second modified contour of the second workpiece. At block 156-5, the storage module 90 may be used to digitally archive the first and second scanned data as a second set of scanned data associated with the second workpiece.

At block 158, the method 150 continues by using the digitally archived sets of scanned data to optimize the procedure for forming a subsequent part with the same desired contour 48. More specifically, the comparator module 44 may be used to compare the first and second sets of scanned data to identify an optimized sequence of bends for forming the part with the desired contour. For example, the first and second sets of scanned data may indicate an optimized location on the part 22 for forming the first bend, and/or an optimized magnitude of bend, either of which when implemented led to more quickly and efficiently forming the part 22 with the desired contour 48. Similarly, an optimized series or sequence of bends may be identified that achieves the desired contour 48 with fewer total bends. Thus, by reviewing the scanned data obtained from prior processes used to form the part 22 with the desired contour 48 and identifying efficient bend locations, magnitudes, and sequences, subsequent processes can be optimized to reduce the time and labor needed to form the part 22 with the desired contour 48.

The method 150 may further include quantifying the difference between the actual contour 52 and the desired contour 48. More specifically, forming the first workpiece at block 154 may further include, after scanning the first workpiece to obtain first scanned data indicative of the first modified contour of the first workpiece, determining a first set of distance errors based on a comparison of the first scanned data indicative of the first modified contour of the first workpiece to the computer model of the desired contour of the part, at block 154-6. Similarly, forming the second workpiece at block 156 may further include, after scanning the second workpiece to obtain first scanned data indicative of the first modified contour of the second workpiece, determining a second set of distance errors based on a comparison of the first scanned data indicative of the first modified contour of the second workpiece to the computer model of the desired contour of the part, at block 156-6.

The method 150 may further include providing visual assistance to the user to help identify where and how to further bend the part 22 to obtain the desired contour 48. More specifically, forming the first workpiece at block 154 may further include, after determining the first set of distance errors at block 154-6, determining at block 154-7 a first contour map of deviation based on the first set of distance errors, the first contour map of deviation being indicative of magnitudes of the first set of distance errors for at least a selected set of points on the first modified contour of the first workpiece, and projecting at block 154-8 a first visible indicia onto the first workpiece, the first visible indicia being based on the first contour map of deviation. Similarly, forming the second workpiece at block 156 may further include, after determining the second set of distance errors, determining at block 156-7 a second contour map of deviation based on the second set of distance errors, the second contour map of deviation being indicative of magnitudes of the second set of distance errors for at least a selected set of points on the first modified contour of the second workpiece, and projecting at block 156-8 a second visible indicia onto the second workpiece, the second visible indicia being based on the second contour map of deviation.

What is claimed is:

1. A method of using metrology to assist in forming a part into a desired contour obtained from a computer model of the part, the method comprising:
    bending the part into a first actual contour using a workstation, the first actual contour having a three-dimensional profile;
    scanning the part to obtain a first set of scanned data indicative of the first actual contour of the part;
    determining a first set of distance errors based on a comparison of the first set of scanned data indicative of the first actual contour to the computer model of the desired contour;
    determining a first contour map of deviation based on the first set of distance errors, the first contour map of deviation being indicative of magnitudes of the first set of distance errors for at least a selected set of points on the first actual contour of the part; and
    projecting a first visible indicia onto the part, the first visible indicia being based on the first contour map of deviation.

2. The method of claim 1, further comprising:
    bending the part into a second actual contour using the workstation, the second actual contour having a three-dimensional profile;
    rescanning the part to obtain a second set of scanned data indicative of the second actual contour of the part;
    determining a second set of distance errors based on a comparison of the second set of scanned data indicative of the second actual contour to the computer model of the desired contour;
    determining a second contour map of deviation based on the second set of distance errors, the second contour map of deviation being indicative of magnitudes of the second set of distance errors for at least a selected set of points on the second actual contour of the part; and
    projecting a second visible indicia onto the part, the second visible indicia being based on the second contour map of deviation.

3. The method of claim 1, further comprising:
    coupling at least one target to the part, each of the at least one target including a contrast target and a reflective target;

locating the part for scanning by identifying a location of the contrast target; and locating the part for projecting by identifying a location of the reflective target.

4. The method of claim 1, further comprising digitally storing the first contour map of deviation.

5. The method of claim 1, in which the first contour map of deviation comprises topographical contour lines.

6. The method of claim 1, in which the first contour map of deviation comprises iso-lines.

7. The method of claim 1, in which scanning the part comprises directing a laser radar toward the part.

8. The method of claim 1, in which projecting the first visible indicia onto the part comprises projecting a laser pattern onto the part.

9. The method of claim 1, in which the part comprises a lay-up mandrel face sheet.

10. A system for forming a part into a desired contour, comprising:
a workstation configured to bend a shape of the part into a first actual contour, the first actual contour having a three-dimensional profile;
a scanner positioned relative to the workstation and configured to obtain a first set of scanned data indicative of the first actual contour of the part;
a computer modeling module associated with the workstation and configured to create a computer model of the desired contour of the part;
a comparator module communicatively coupled to the scanner and the computer modeling module and configured to:
compare the first set of scanned data indicative of the first actual contour with the computer model of the desired contour to obtain a first set of distance errors between the first actual contour and the desired contour; and
determine a first contour map of deviation based on the first set of distance errors, the first contour map of deviation being indicative of magnitudes of the first set of distance errors for at least a selected set of points on the first actual contour of the part; and
a projector associated with the workstation and communicatively coupled to the comparator module, the projector being configured to project a first visible indicia onto the part, the first visible indicia being based on the first contour map of deviation.

11. The system of claim 10, further comprising at least one target configured to be coupled to the part, each of the at least one target including a contrast target identifiable by the scanner and a reflective target identifiable by the projector.

12. The system of claim 10, in which the first contour map of deviation comprises topographical contour lines.

13. The system of claim 10, in which the first contour map of deviation comprises iso-lines.

14. The system of claim 10, in which the scanner comprises a laser radar.

15. The system of claim 10, in which the projector comprises a laser projector configured to project a laser pattern onto the part.

16. The system of claim 10, in which the part comprises a lay-up mandrel face sheet.

17. The system of claim 10, further comprising a storage module configured to digitally archive the first contour map of deviation.

18. A method of using metrology to optimize a manufacturing process to form a part having a desired contour, the method comprising:
generating a computer model of the desired contour;
forming a first workpiece having an initial contour by:
bending the first workpiece from the initial contour to a first modified contour, the first modified contour having a three-dimensional profile;
scanning the first workpiece to obtain first scanned data indicative of the first modified contour of the first workpiece;
determining a first set of distance errors based on a comparison of the first scanned data indicative of the first modified contour of the first workpiece to the computer model of the desired contour of the part;
determining a first contour map of deviation based on the first set of distance errors, the first contour map of deviation being indicative of magnitudes of the first set of distance errors for at least a selected set of points on the first modified contour of the first workpiece;
projecting a first visible indicia onto the first workpiece, the first visible indicia being based on the first contour map of deviation;
bending the first workpiece from the first modified contour to a second modified contour, the second modified contour having a three-dimensional profile;
scanning the first workpiece to obtain second scanned data indicative of the second modified contour of the first workpiece; and
storing the first and second scanned data as a first set of scanned data associated with the first workpiece;
forming a second workpiece having an initial contour, the initial contour of the second workpiece being substantially identical to the initial contour of the first workpiece, by:
bending the second workpiece from an initial contour to a first modified contour, the first modified contour having a three-dimensional profile;
scanning the second workpiece to obtain first scanned data indicative of the first modified contour of the second workpiece;
determining a second set of distance errors based on a comparison of the first scanned data indicative of the first modified contour of the second workpiece to the computer model of the desired contour of the part;
determining a second contour map of deviation based on the second set of distance errors, the second contour map of deviation being indicative of magnitudes of the second set of distance errors for at least a selected set of points on the first modified contour of the second workpiece;
projecting a second visible indicia onto the second workpiece, the second visible indicia being based on the second contour map of deviation;
bending the second workpiece from the first modified contour to a second modified contour, the second modified contour having a three-dimensional profile;
scanning the second workpiece to obtain second scanned data indicative of the second modified contour of the second workpiece; and
storing the first and second scanned data as a second set of scanned data associated with the second workpiece; and
comparing the first and second sets of scanned data to identify an optimized sequence of bends for forming the part.

19. The method of claim 18, in which the first contour map of deviation comprises topographical contour lines.

20. The method of claim 18, in which the first contour map of deviation comprises iso-lines.

\* \* \* \* \*